United States Patent [19]
Muramatsu

[11] Patent Number: 5,963,718
[45] Date of Patent: Oct. 5, 1999

[54] METHOD AND APPARATUS FOR CORRECTING ERROR IN CONTROL FIELD IN CACHE MEMORY

[75] Inventor: Midori Muramatsu, Yamanashi, Japan

[73] Assignee: NEC Corporation, Tokyo, Japan

[21] Appl. No.: 08/665,375

[22] Filed: Jun. 19, 1996

[30] Foreign Application Priority Data

Jun. 28, 1995 [JP] Japan ................................... 7-162546

[51] Int. Cl.$^6$ .................................................... G06F 12/08
[52] U.S. Cl. ....................................................... 395/185.07
[58] Field of Search ........................ 395/185.07, 185.05, 395/182.04; 371/40.1, 40.2, 40.4, 37.1

[56] References Cited

U.S. PATENT DOCUMENTS

| | | | |
|---|---|---|---|
| 4,092,713 | 5/1978 | Scheuneman | 395/185.06 |
| 4,942,579 | 7/1990 | Goodlander et al. | 371/51.1 |
| 4,995,041 | 2/1991 | Hetherington et al. | 371/40.1 |
| 5,233,616 | 8/1993 | Callander | 371/40.2 |
| 5,335,234 | 8/1994 | Matteson et al. | 371/40.1 |
| 5,509,119 | 4/1996 | La Fetra | 395/185.05 |
| 5,629,950 | 5/1997 | GOdiwala et al. | 371/51.1 |
| 5,649,090 | 7/1997 | Edwards et al. | 395/182.08 |

OTHER PUBLICATIONS

J. Archibald et al.; "Cache Coherence Protocols: Evaluation Using a Multi–processor Simulation Model"; ACM Transactions on Computer Systems, vol. 4, No. 4, Nov. 1986, pp. 273–298.

Primary Examiner—Ly Hua
Attorney, Agent, or Firm—McGinn & Gibb, P.C.

[57] ABSTRACT

A control field in a store-in cache memory in a multi-processor system includes a valid bit, an exclusive bit, and a clean bit. An error in the control field is not only detectable but also correctable by a control field correction circuit. The control field correction circuit includes a mode register holding inhibit correction flags, inhibit correction-in-part flags, and detect inconsistency flags.

29 Claims, 8 Drawing Sheets

| VALID | EXCLUSIVE | CLEAN | CACHE STATUS |
|---|---|---|---|
| 0 | 0 | 0 | IV |
| 1 | 0 | 1 | CS |
| 1 | 1 | 0 | DE |
| 1 | 1 | 1 | CE |

IV: INVALID
CS: CLEAN SHARED
CE: CLEAN EXCLUSIVE
DE: DIRTY EXCLUSIVE

METHOD AND APPARATUS FOR CORRECTING ERROR IN CONTROL FIELD IN CACHE MEMORY

BACKGROUND OF THE INVENTION

The present invention relates to a method and circuit for correcting error in a cache memory, and more particularly to error correction of a control field of a store-in cache memory in a multi-processor system.

In a conventional multi-processor system in which each processor has a store-in cache memory, each cache memory has one of four cache statuses (e.g., "IV", "CE", "CS" and "DE") to maintain a cache coherency.

A cache status "IV" represents that a data in a corresponding line is invalid. A cache status "CE" represents that a data in a corresponding line is coherent with a data stored in a main storage (e.g., "clean"), and that no other cache memory has a copy of the data (e.g., "exclusive"). A cache status "CS" represents that a data in a corresponding line is coherent with a data stored in a main storage (e.g., "clean"), and that any other cache memories (e.g., at least one cache memory) may have a copy of the data (e.g., "shared"). A cache status "DE" represents that a data in a corresponding line is not coherent with a data stored in a main storage (e.g., "dirty"), and that no other cache memory has a copy of the data (e.g., "exclusive").

In the conventional system, when the cache status is "DE", if it is erroneously determined to be "CS" or "CE" because of a fault in the control field, a data representing sole or exclusive information in the system is lost. Thus, because the fault in the store-in cache causes a fault in the main storage, reliability of the control field should be enhanced.

Referring to FIG. 1, a conventional cache memory has a three-bit control field comprising a valid bit (V), a shared bit (S), and a dirty bit (D). The valid bit represents that a data in a corresponding line is valid if the valid bit is active (e.g., V="1"). The shared bit represents that a data in a corresponding line is shared by any other cache memories (e.g., at least one cache memory) if the shared bit is active (e.g., S="1"). The dirty bit represents that a data in a corresponding line is not coherent with a data stored in a main storage (e.g., D="1").

The conventional cache memory has cache status "IV" when all bits in the control field are inactivated (e.g., V="0", S="0", and D="0"). The conventional cache memory has cache status "CS" when only the dirty bit is inactivated (e.g., V="1", S="1", and D="0"). The conventional cache memory has cache status "DE" when only the shared bit is inactivated (e.g., V="1", S="0", and D="1"). The conventional cache memory has cache status "CE" when only the valid bit is activated (e.g., V="1", S="0", and D="0").

Referring to FIG. 2, in the conventional cache memory, it is determined whether an error has occurred in the control field in step S901. If any error is detected, then the error is reported to a processor or a diagnostic processor in step S908, and a process is aborted (e.g., the system is shutdown). If no error is detected, then a cache status is determined depending on the control field according to steps S902 through S907.

However, this conventional cache memory has a problem in that the control field cannot be corrected while error in the control field is detected. For example, when error in the valid bit is detected, the valid bit cannot be corrected based on the shared bit or the dirty bit.

Furthermore, in the conventional cache memory, since error in the control field causes a system shutdown, the system's reliability is decreased.

SUMMARY OF THE INVENTION

In view of the foregoing problems of the conventional system, an object of the present invention is to correct an error in the control field of a cache memory.

In an error correction circuit according to a first aspect of the present invention, a first correcting circuit corrects at least one bit of a plurality of bits in the control field in a fixed, predetermined manner; and a second correcting circuit corrects the at least one bit based on a status of the cache memory.

With the unique and unobvious structure of the present invention, error in the control field is corrected appropriately without aborting the process or shutting-down the system.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

A circuit and a method of correcting error in a control field in a cache memory in accordance with a preferred embodiment of the present invention will be described in detail with reference to the accompanying drawings.

Figures 1, 2:
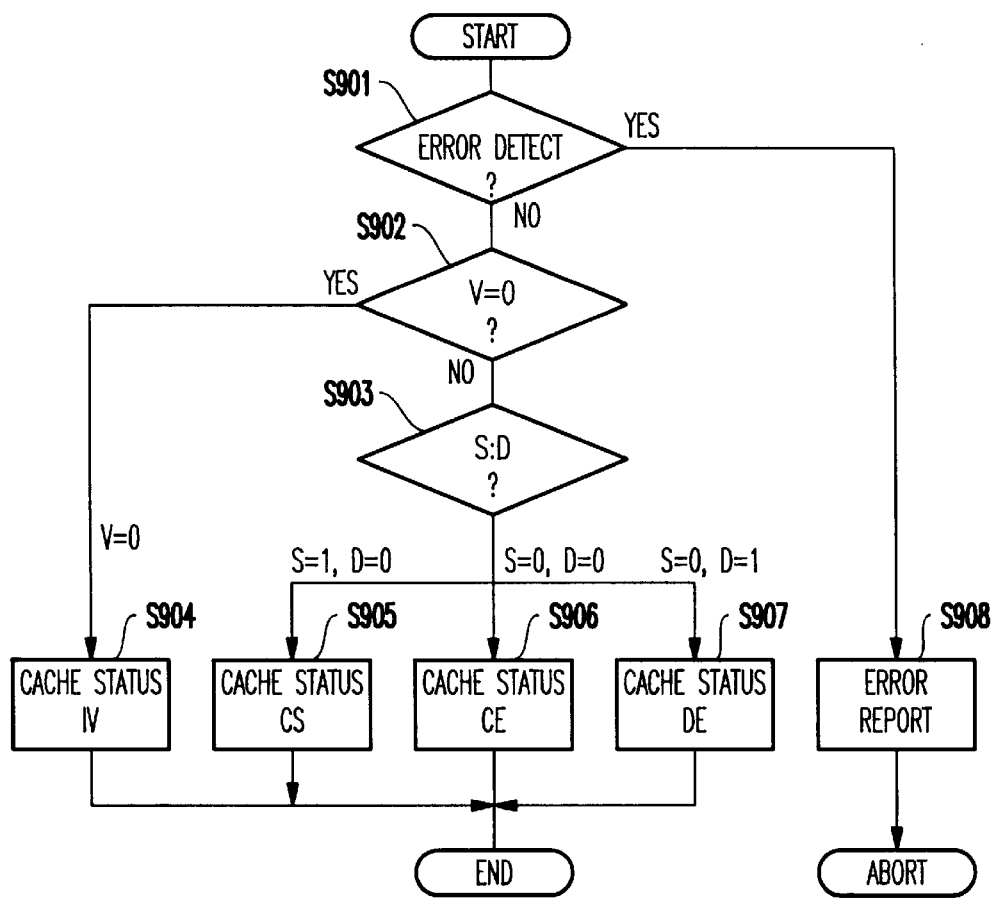
FIG. 1 is a table showing correspondence between a control field and a cache status in a conventional cache memory.
FIG. 2 is a flowchart showing the operation of determining the cache status in the conventional cache memory.
Figure 3:
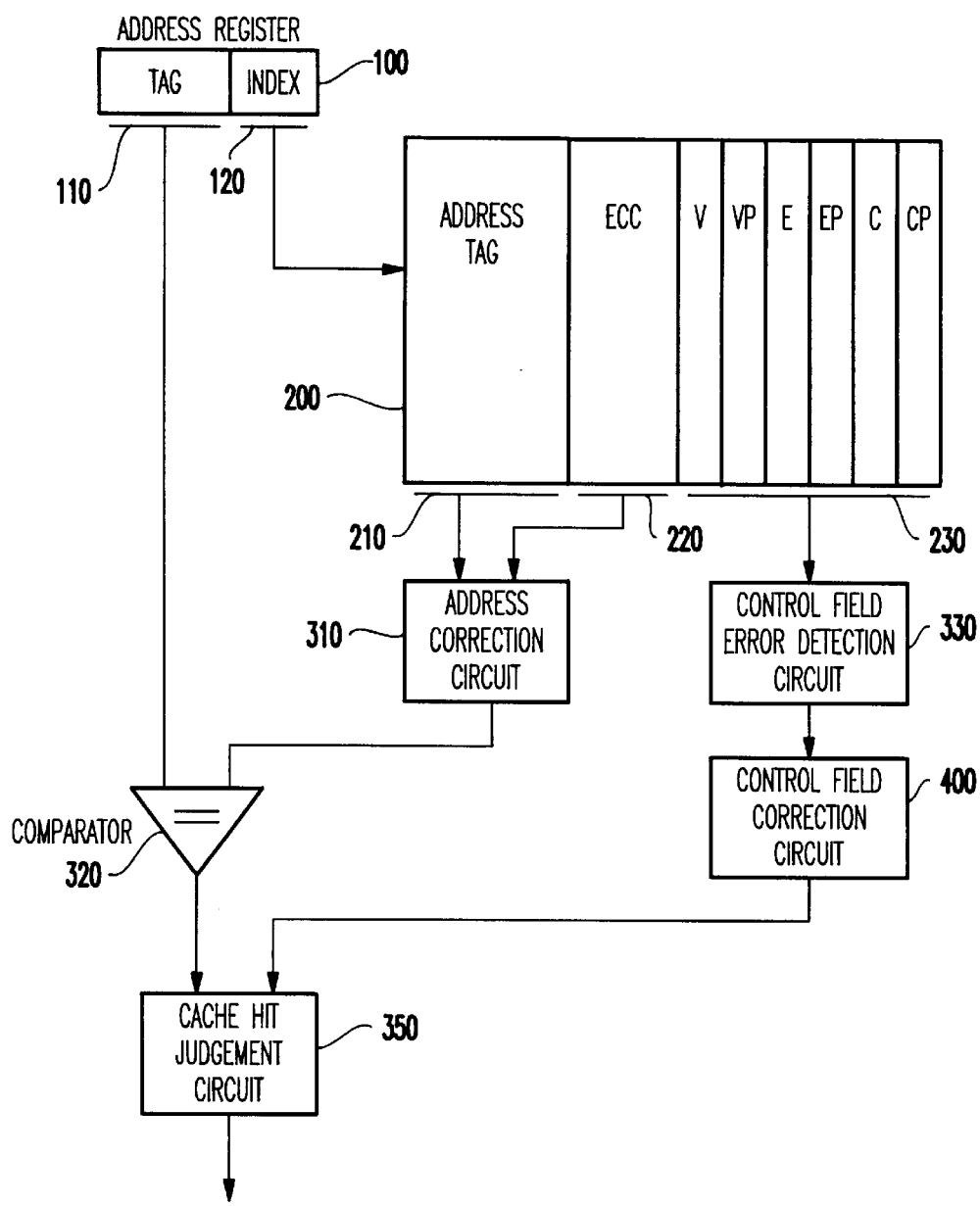
FIG. 3 is a block diagram showing the configuration of a cache memory according to an embodiment of the present invention.

Referring to FIG. 3, a cache memory has an address register 100, a tag memory 200, an address correction circuit 310, a comparator 320, a control field error I detection circuit 330, a control field correction circuit 400, and a cache "hit" judgement circuit 350.

The address register 100 includes a tag field 110 and an index field 120. The index field 120 is used to select a row (e.g., a set) of the cache memory. The tag field 110 is used as a matching "key" to find a line.

The tag memory 200 has a plurality of words. Each of the words comprises an address tag field 210, an error correction code field (ECC) 220, and a control field 230. The address tag field 210 is compared with the tag field 110 in the address register 100. The ECC 220 is used to correct the address tag field 210 when error occurs in the address tag field 210.

The control field 230 includes a valid bit (V), an exclusive bit (E), and a "clean" bit (C). The valid bit represents that a data in a corresponding line is valid if the valid bit is active (e.g., V="1"). The exclusive bit represents that a data in a corresponding line is not shared by any other cache memories (e.g., at least one cache memory) if the shared bit is active (e.g., E="1"). The clean bit represents that a data in a corresponding line is coherent with a data stored in a main storage (e.g., C="1"). The control field 230 also includes parity bits for the valid bit (VP), the exclusive bit (EP), and the clean bit (CP). These parity bits have the same contents as the original bits under a non-error state (e.g., V=VP, E=EP, and C=CP).

The address correction circuit 310 corrects the address tag 210 with the ECC 220 when error occurs in the address tag 210.

The comparator 320 compares the tag field 110 and the address tag 210 corrected by the address correction circuit 310 to find a "matching" line.

The control field error detection circuit 330 detects error in the control field 230 by using the parity bits. If any pair of an original bit and a parity bit are inconsistent (e.g., V VP, E EP, or C CP), then the control field error detection circuit 330 judges that an error has occurred.

The control field correction circuit 400 corrects the control field 230 when error occurs in the control field 230.

The cache hit judgement circuit 350 judges whether necessary data is in the cache memory (e.g., a cache "hit").

Figures 4, 5:
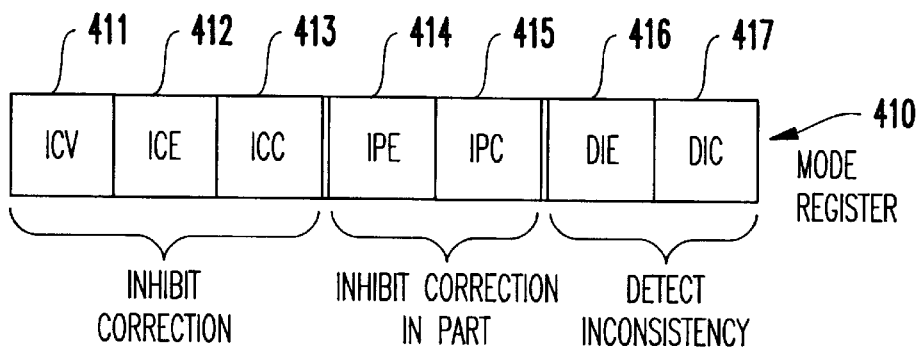
FIG. 4 is a table showing correspondence between a control field and a cache status in the cache memory according to the embodiment of the present invention.
FIG. 5 is a configuration of a mode register 410 in a control field correction circuit 400.

Referring to FIG. 4, the cache memory has one of four cache statuses (e.g., "IV", "CE", "CS" and "DE") to maintain a cache coherency as in the conventional cache memory.

Specifically, the cache memory has a cache status "IV" when all bits in the control field are inactivated (e.g., V="0", E="0", and C="0"). The cache memory has a cache status "CS" when only the exclusive bit is inactivated (e.g., V="1", E="0", and C="1"). The cache memory has a cache status "DE" when only the clean bit is inactivated (e.g., V="1", E="1", and C="1"). The cache memory has a cache status "CE" when all bits in the control field are activated (e.g., V="1", E="1", and C="1").

Referring to FIG. 5, a mode register 410 in the control field correction circuit 400 holds status flags for correction operations. The mode register 410 holds inhibit correction flags, inhibit correction-in-part (e.g., partial correction) flags, and detect inconsistency flags. The mode register 410 is set by a system operator (e.g., through a diagnostic processor).

The inhibit correction flags include an Inhibit Correction V (ICV) 411, an Inhibit Correction E (ICE) 412, and an Inhibit Correction C (ICC) 413. If the inhibit correction flags are activated (e.g., ICV="1"), then the bits in the control field (e.g., V) are not corrected even though the bits have errors.

The inhibit correction-in-part flags include an Inhibit correction-in-Part E (IPE) 414, and an Inhibit correction-in-Part C (IPC) 415. If the inhibit correction-in-part flags are activated (e.g., IPE="1"), then the bits in the control field (e.g., E) are not corrected when the correction is non-deterministic (e.g., whenever E="0" or E="1").

The detect inconsistency flags include a Detect Inconsistency E (DIE) 416, and a Detect Inconsistency C (DIC) 417. If the detect inconsistency flags are activated (e.g., DIC="1"), then the bits in the control field (e.g., C) are not corrected when the corrected control field has an inconsistent pattern (e.g., V="0" & E="1" & C="0").

Hereinbelow and referring to FIGS. 3 and 6 to 11B, the operation of the cache memory in accordance with the above-mentioned embodiment of the present invention will be described.

Figure 6:
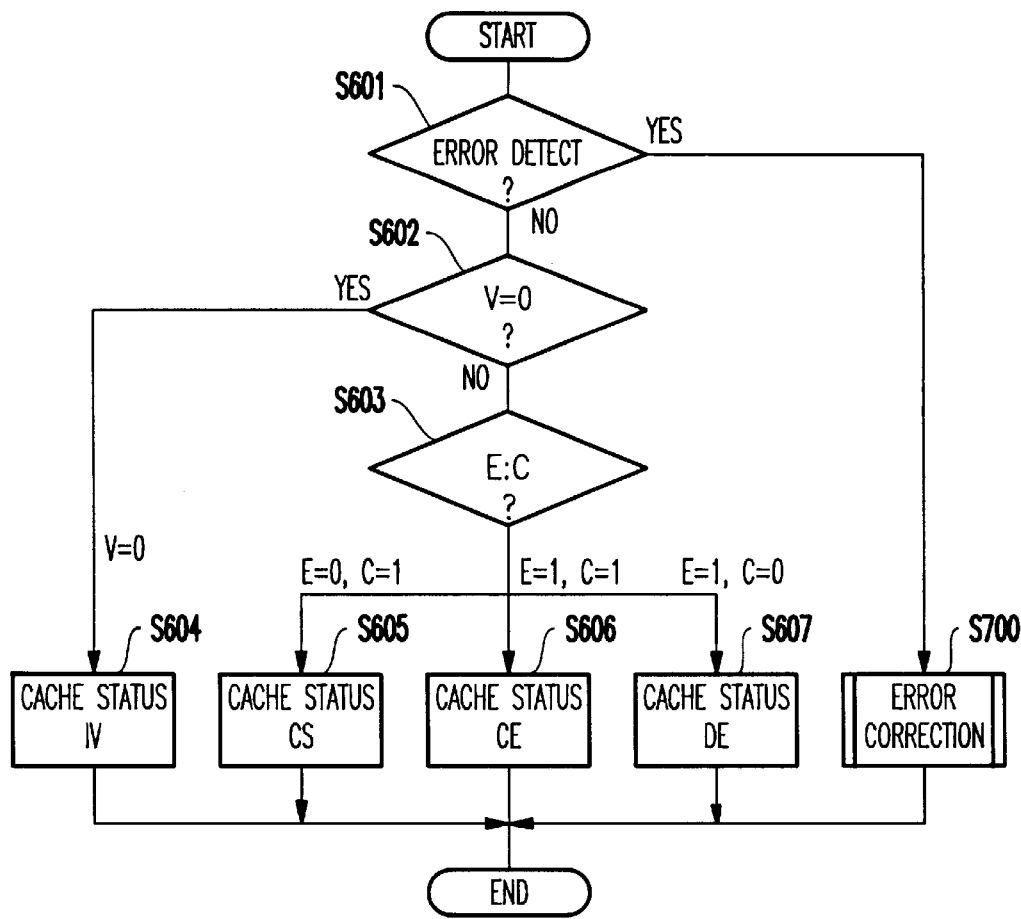
FIG. 6 is a flowchart showing the operation of determining the cache status in the cache memory according to the embodiment of the present invention.

Referring to FIG. 6, if the control field error detection circuit 330 detects an error in the control field in step S601, then the control field correction circuit 400 corrects the error in step S700 as described later. Conversely, if the control field error detection circuit 330 does not detect an error in the control field in step S601, then the cache hit judgement circuit 350 judges a cache status in steps S602 through S607.

In step S602, it is determined whether the valid bit is activated. If the valid bit is not activated (e.g., V="0") in step S602, then a cache status is judged as "IV" in step S604. If the valid bit is activated (e.g., V="1") in step S602, then the exclusive bit and the clean bit are checked in step S603 to judge whether these bits are activated. If only the clean bit is activated (e.g., E="0" and C="1"), then a cache status is judged as "CS" in step S605. If both the exclusive bit and the clean bit are activated (e.g., E="1" and C="1"), then a cache status is judged as "CE" in step S606. If only the exclusive bit is activated (e.g., E="1" and C="0"), a cache status is judged as "DE" in step S607.

Figure 7:
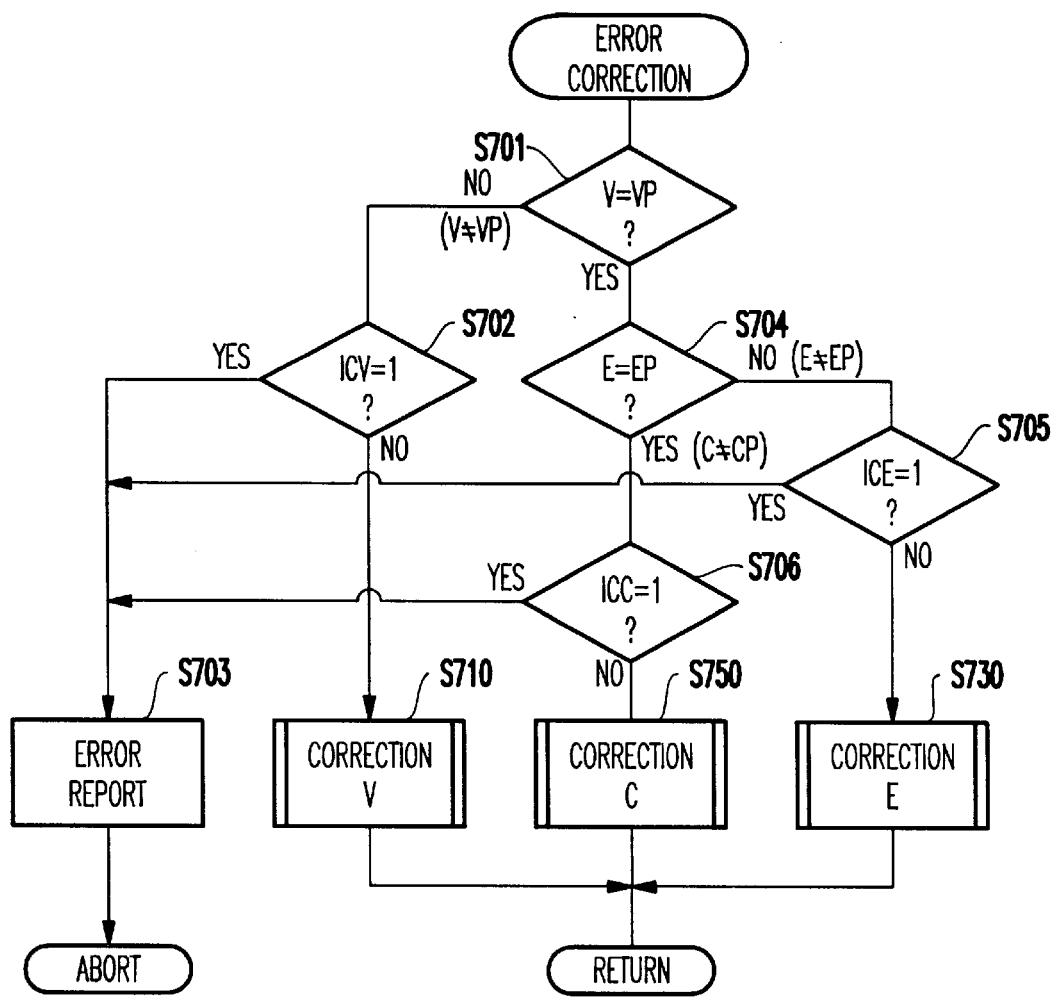
FIG. 7 is a flowchart showing the error correction operation of the control field in the cache memory according to the embodiment of the present invention.

Referring to FIG. 7, the error correction process in step S700 of FIG. 6 is described below. If the error is determined to be caused by the valid bit (e.g., V VP) in step S701, then the ICV is checked in step S702 to judge whether it is activated. If the ICV is not activated (e.g., ICV="0"), then the valid bit is corrected in step S710. If the ICV is activated (e.g., ICV="1"), then the error in the valid bit is reported in step S703, and the process is aborted.

If the error is caused by the exclusive bit (e.g., E EP) in step S704, the ICE is checked in step S705. If the ICE is not activated (e.g., ICE="0"), the exclusive bit is corrected in step S730. If the ICE is activated (e.g., ICE="1"), then the error in the exclusive bit is reported in step S703, and the process is aborted.

If the error is caused by the clean bit (e.g., C CP) in step S704, then the ICC is checked in step S706 to judge whether the ICC is activated. If the ICC is not activated (e.g., ICC="0"), then the clean bit is corrected in step S750. If the ICC is activated (e.g., ICC="1"), then the error in the clean bit is reported in step S703, and the process is aborted.

Figure 8:
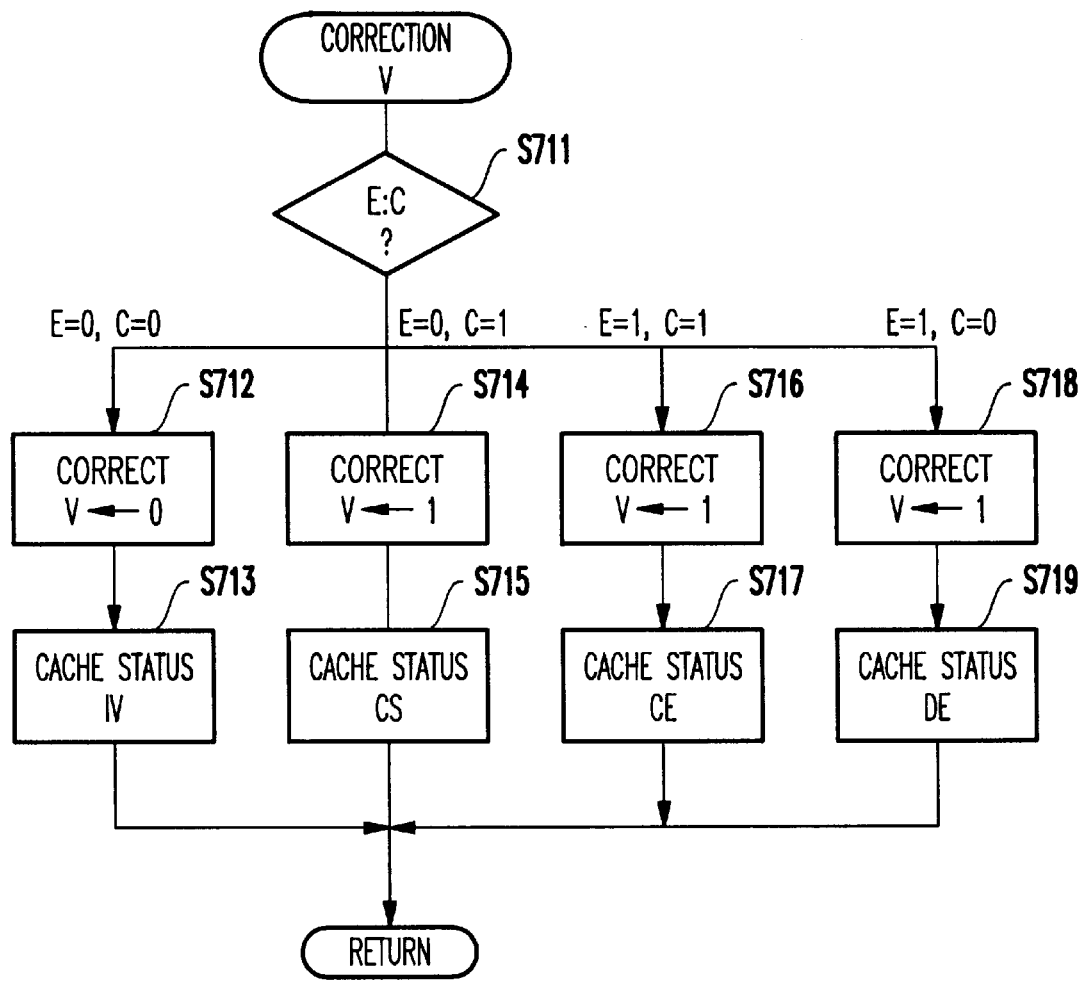
FIG. 8 is a flowchart showing the error correction operation of a valid bit in the cache memory according to the embodiment of the present invention.

Referring to FIG. 8 and as described below, the valid bit is corrected in step S710 shown in FIG. 7. First, both the exclusive bit and the clean bit are checked in step S711.

If neither the exclusive bit nor the clean bit is activated (e.g., E="0" and C="0"), then the valid bit is corrected (e.g., set) to be inactivated (e.g., V="0") in step S712, and a cache status is judged as "IV" in step S713. If only the clean bit is activated (e.g., E="0" and C="1"), then the valid bit is corrected to be activated (e.g., V="1") in step S714, and a cache status is judged as "CS" in step S715.

If both the exclusive bit and the clean bit are activated (e.g., E="1" and C="1"), then the valid bit is corrected to be activated (e.g., V="1") in step S716, and a cache status is judged as "CE" in step S717. If only the exclusive bit is activated (e.g., E="1" and C="0"), then the valid bit is corrected to be activated (e.g., V="1") in step S718, and a cache status is judged as "DE" in step S719.

Figure 11A:
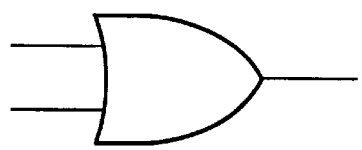
FIG. 11A illustrates a logical OR gate as a preferred structure for a circuit for correcting a valid bit.

Preferably, a circuit for correcting the valid bit comprises a logical OR gate such as that shown in FIG 11A.

Figure 9:
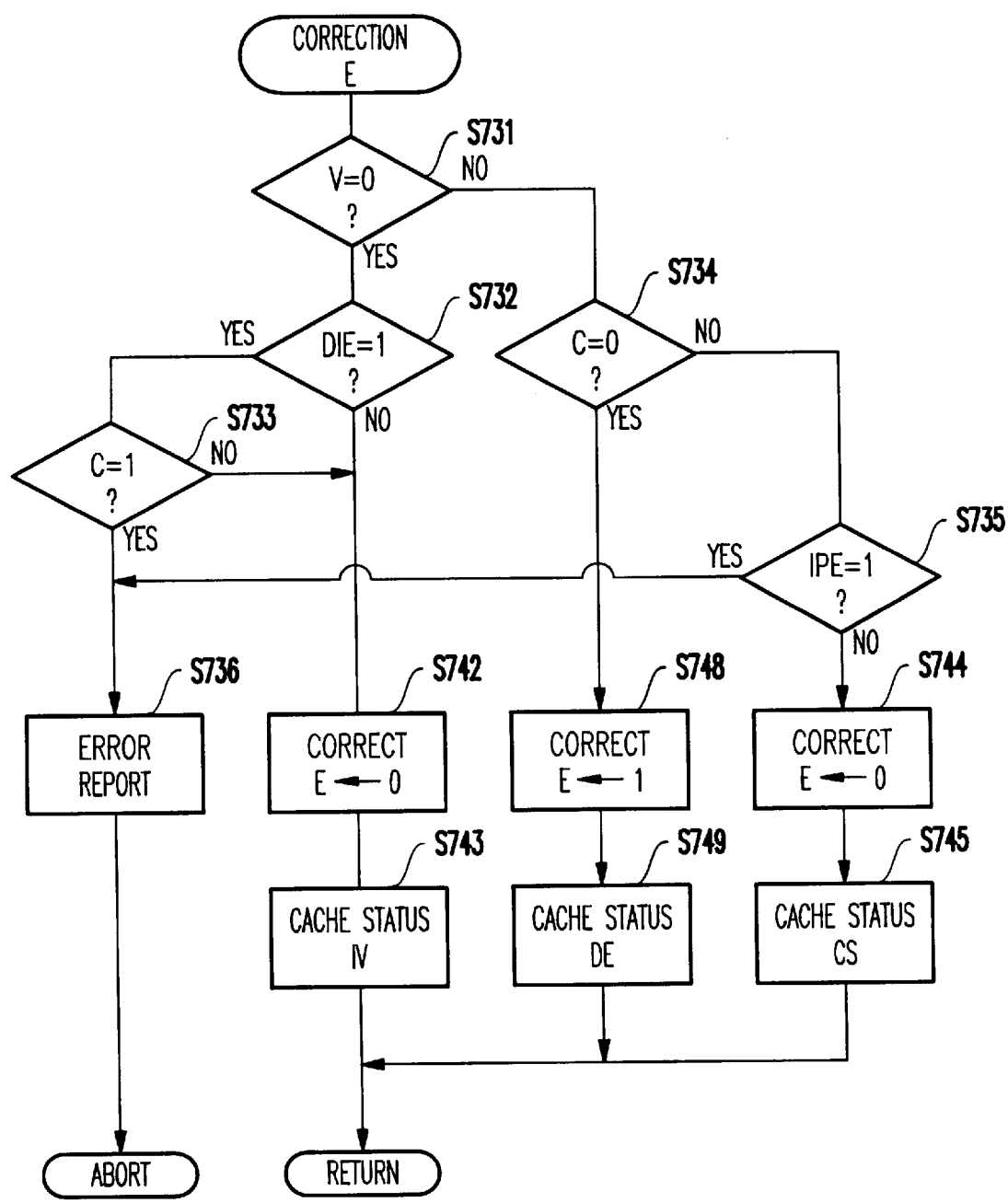
FIG. 9 is a flowchart showing the error correction operation of an exclusive bit in the cache memory according to the embodiment of the present invention.

Referring to FIG. 9 and as described in further detail below, the exclusive bit is corrected in step S730 shown in FIG. 7. First, if the valid bit is not activated (e.g., V="0") in step S731, then the DIE is checked in step S732 to judge whether it is activated. If the DIE is activated (e.g., DIE="1"), then the clean bit is checked in step S733 to judge whether the clean bit is activated. If the clean bit is activated (e.g., C="1"), then the error in the clean bit, because of inconsistency (e.g., not defined in FIG. 4), is reported in step S736, and the process is aborted.

If the DIE is not activated (e.g., DIE="0") in step S732 or if the clean bit is not activated (e.g., C="0") in step S733, then the exclusive bit is corrected (e.g., set) to be inactivated (e.g., E="0") in step S742, and a cache status is judged as "IV" in step S743.

If the valid bit is activated (e.g., V="1") in step S731, then the clean bit is checked in step S734 to judge whether the clean bit is activated. If the clean bit is not activated (e.g., C="0") in step S734, then the exclusive bit is corrected to be activated (e.g., E="1") in step S748, and a cache status is judged as "DE" in step S749.

If the clean bit is activated (e.g., C="1") in step S734, then the IPE is checked in step S735. If the IPE is activated (e.g., IPE="1") in step S735, then the error in the exclusive bit is reported in step S736 because it is not deterministic (e.g., unknown or at least not known with certainty) as to whether the exclusive bit is activated (e.g., a cache status is "CE" in the last row of a table in FIG. 4) or not (e.g., a cache status is "CS" in the second row of a table in FIG. 4). Then, the process is aborted.

If the IPE is not activated (e.g., IPE="0") in step S735, then the exclusive bit is corrected to be inactivated (e.g., E="0") in step S744, and a cache status is judged as "CS" in step S745. Although this correction of the exclusive bit is non-deterministic, selection of a cache status "CS" (e.g., "clean shared") is safer and potentially less harmful to system operation than selection of a cache status "CE" (e.g., "clean exclusive").

Specially, a cache status "CS" requires invalidating other cache memories upon a next write request. However, this invalidation is not "harmful" (e.g., not detrimental to system operation). In contrast, when a cache status is erroneously judged as "CE" instead of "CS", cache statuses of other cache memories remain "CS", which causes inconsistent cache statuses and erroneous operation by the system due to the cache data incoherency.

Preferably, a circuit for correcting the exclusive bit comprises a logical exclusive-OR gate.

Figure 10:
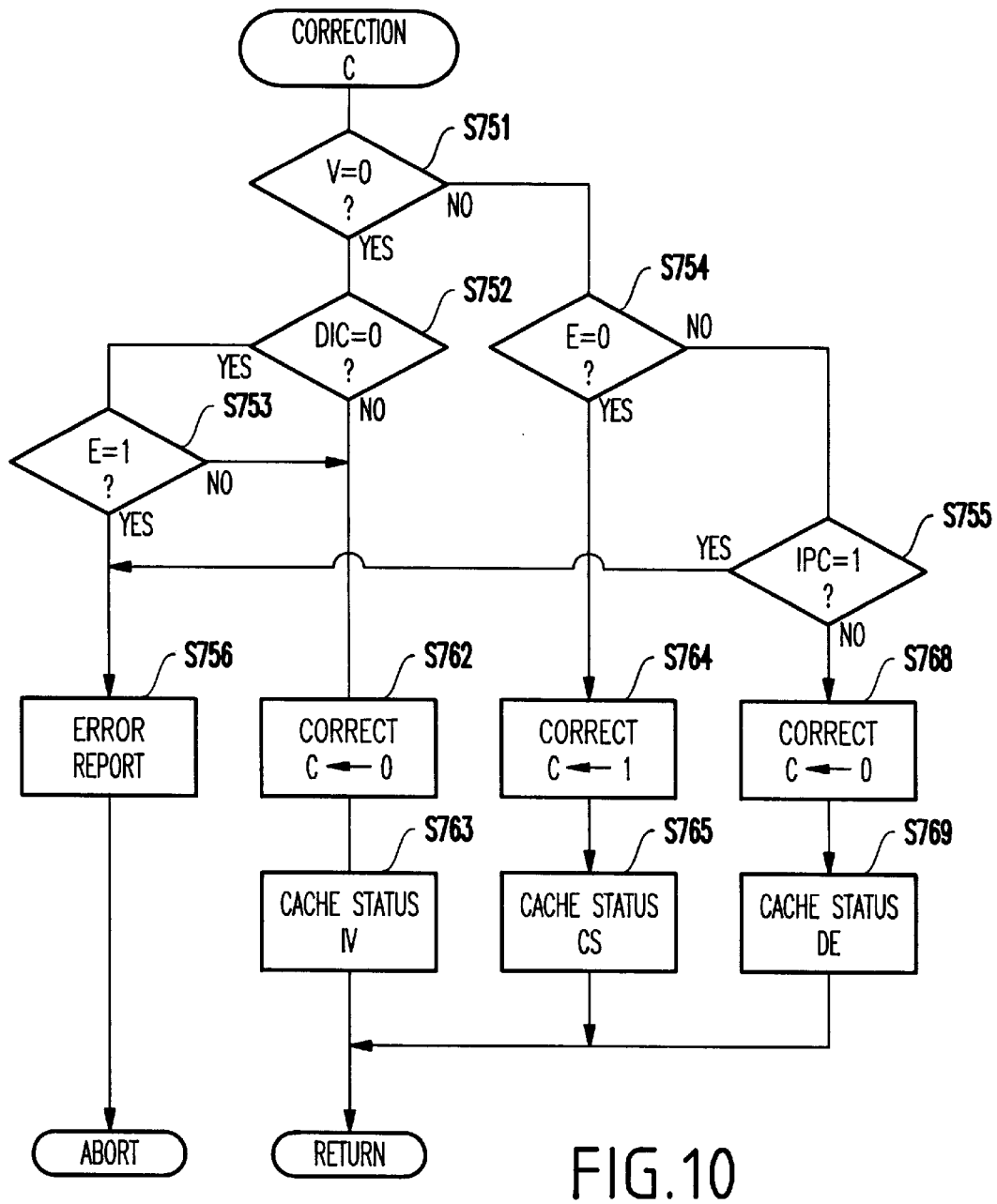
FIG. 10 is a flowchart showing the error correction operation of a "clean" bit in the cache memory according to the embodiment of the present invention.

Referring to FIG. 10 and as described below, the clean bit is corrected in step S750 shown in FIG. 7. If the valid bit is not activated (e.g., V="0") in step S751, then the DIC is checked in step S752 to judge whether it is activated. If the DIC is activated (e.g., DIC="1"), then the exclusive bit is checked in step S753. If the exclusive bit is activated (e.g., E="1"), then the error in the exclusive bit, because of inconsistency (e.g., not defined in FIG. 4), is reported in step S756, and the process is aborted.

If the DIC is not activated (e.g., DIC="0") in step S752 or if the exclusive bit is not activated (e.g., E="0") in step S753, then the clean bit is corrected to be inactivated (e.g., C="0") in step S762, and a cache status is judged as "IV" in step S763.

If the valid bit is activated (e.g., V="1") in step S751, then the exclusive bit is checked in step S754. If the exclusive bit is not activated (e.g., E="0") in step S754, then the clean bit is corrected to be activated (e.g., C="1") in step S764, and a cache status is judged as "CS" in step S765.

If the exclusive bit is activated (e.g., E="1") in step S754, then the IPC is checked in step S755 to judge whether the IPC is activated. If the IPC is activated (e.g., IPC="1") in step S755, then the error in the clean bit is reported in step S756 because it is not deterministic (e.g., not known with certainty) whether the clean bit is activated (e.g., a cache status is "CE" in the last row of a table in FIG. 4) or not (e.g., a cache status is "DE" in the third row of a table in FIG. 4). Then, the process is aborted.

If the IPC is not activated (e.g., IPC="0") in step S755, the clean bit is corrected to be inactivated (e.g., C="0") in step S768, and a cache status is judged as "DE" in step S769. Although this correction of the exclusive bit is non-deterministic, selection of a cache status "DE" is safer than selection of a cache status "CE".

Specially, a cache status "DE" ("Dirty Exclusive") requires writing-back a "dirty" line to a main storage. However, but the write-back is not "harmful". In contrast, when a cache status is erroneously judged as "CE" instead of "DE", the "dirty" line is disposed even though the "dirty" line includes the newest data. Thus, the newest data will be lost and there potentially may be a data coherency problem.

Figure 11B:
FIG. 11B illustrates a logical exclusive-OR gate as a preferred structure for a circuit for correcting a clean bit.

Preferably, a circuit for correcting the clean bit comprises a logical exclusive-OR gate such as that shown in FIG. 11B.

As is apparent from the above description, according to the present invention, since error in the control field of a cache memory is correctable appropriately and relatively easily, a cache status and a cache "hit" can be efficiently determined without aborting the process and shutting-down the system. Hence, the control field can be corrected while error in the control field is detected. For example, when a valid bit error is detected, the valid bit can be corrected from either a "shared" bit or a "dirty" bit. Moreover, the system's reliability is increased over that of the conventional system.

While the invention has been described in terms of a preferred embodiment, those skilled in the art will recognize that the invention can be practiced with modification within the spirit and scope of the appended claims.

What is claimed is:

1. An error correction circuit for a cache memory having a control field, said error correction circuit comprising:
    a first correcting circuit for correcting at least one bit of a plurality of bits in the control field in a fixed, predetermined manner; and
    a second correcting circuit for correcting said at least one bit based on a status of said cache memory.

2. The error correction circuit according to claim 1, wherein said first correcting circuit corrects said at least one bit based on bits other than said at least one bit in the control field.

3. The error correction circuit according to claim 1, wherein said second correcting circuit corrects said at least one bit based on a status of said cache memory and bits other than said at least one bit.

4. The error correction circuit according to claim 1, wherein said second correcting circuit corrects said at least one bit based on a predetermined status as said status of said cache memory.

5. The error correction circuit according to claim 4, wherein said second correcting circuit corrects said at least one bit by selecting preferentially a value representing a clean-shared status of said cache memory over a value representing a clean-exclusive status of said cache memory.

6. The error correction circuit according to claim 4, wherein said second correcting circuit corrects said at least one bit by selecting preferentially a value representing a dirty-exclusive status of said cache memory over a value representing a clean-exclusive status of said cache memory.

7. The error correction circuit according to claim 1, said first correcting circuit comprising a logical OR gate.

8. The error correction circuit according to claim 1, said second correcting circuit comprising a logical exclusive-OR gate.

9. The error correction circuit according to claim 1, further comprising:
a mode register for selectively holding inhibit correction flags, inhibit correction-in-part flags, and detect inconsistency flags in one of an activated state and an inactivated state.

10. The error correction circuit according to claim 9, further comprising:
means for judging a state of said inhibit correction flags held in said mode register,
wherein an error is reported to said cache memory without error correction when said inhibit correction flags are judged by said means for judging to be activated.

11. The error correction circuit according to claim 9, further comprising:
means for judging a state of said inhibit correction-in-part flags held in said mode register; and
means for determining whether error correction is non-deterministic,
wherein an error is reported without said error correction if said error correction is judged as being non-deterministic when said inhibit correction-in-part flags are judged to be activated.

12. The error correction circuit according to claim 9, further comprising:
means for judging a state of said detect inconsistency flags held in said mode register; and
means for determining whether said error correction causes inconsistency when said detect inconsistency flags are activated,
wherein an error is reported without said error correction if said error correction causes inconsistency when said detect inconsistency flags are judged to be activated.

13. A cache memory comprising:
a tag memory for holding an address tag and a control field;
an error detection circuit for detecting error in said control field; and
an error correction circuit for correcting, based on a status of said cache memory, the error detected by said error detection circuit.

14. The cache memory according to claim 13, said error correction circuit comprising:
a first correcting circuit for correcting at least one bit of a plurality of bits in the control field in a fixed, predetermined manner; and
a second correcting circuit for correcting said at least one bit based on a status of said cache memory.

15. The cache memory according to claim 14, wherein said first correcting circuit corrects said at least one bit based on bits other than said at least one bit in the control field.

16. The cache memory according to claim 14, wherein said second correcting circuit corrects said at least one bit based on said status of said cache memory and bits other than said at least one bit.

17. The cache memory according to claim 14, wherein said second correcting circuit corrects said at least one bit by selecting a value representing a predetermined status of said cache memory as said status of said cache memory.

18. The cache memory according to claim 17, wherein said second correcting circuit corrects said at least one bit by selecting preferentially a value representing a clean-shared status of said cache memory over a value representing a clean-exclusive status of said cache memory.

19. The cache memory according to claim 17, wherein said second correcting circuit corrects said at least one bit by selecting preferentially a dirty-exclusive status of said cache memory over a clean-exclusive status of said cache memory.

20. The cache memory according to claim 13, said control field comprising a first bit and second bits, wherein said first bit is correctable from said second bits in a fixed, predetermined manner.

21. The cache memory according to claim 20, said first bit comprising a valid bit, and said second bits comprising an exclusive bit and a clean bit.

22. The cache memory according to claim 13, further comprising:
a mode register for selectively holding inhibit correction flags, inhibit correction-in-part flags, and detect inconsistency flags in one of an activated state and an inactivated state.

23. The cache memory according to claim 22, further comprising:
means for judging a state of said inhibit correction flags held in said mode register,
wherein an error is reported to said cache memory without error correction when said inhibit correction flags are judged to be activated.

24. The cache memory according to claim 22, further comprising:
means for judging a state of said inhibit correction-in-part flags held in said mode register; and
means for determining whether an error correction is non-deterministic,
wherein an error is reported without said error correction if said error correction is determined to be non-deterministic when said inhibit correction-in-part flags are judged to be activated.

25. The cache memory according to claim 22, further comprising:
means for judging a state of said detect inconsistency flags held in said mode register; and
means for determining whether an error correction causes inconsistency when said detect inconsistency flags are activated,
wherein an error is reported without said error correction if the error correction is judged to cause inconsistency when said detect inconsistency flags are activated.

26. A method of correcting error in a cache memory having a control field, said method comprising steps of:
detecting an error in said control field of said cache memory; and
correcting said error by correcting at least one bit of a plurality of bits in the control field based on bits other than said at least one bit and a status of said cache memory.

27. The method according to claim 26, further comprising steps of:

providing a mode register for selectively holding inhibit correction flags in one of an activated state and an inactivated state; and reporting the error and aborting a process of said cache memory if said inhibit correction flags are activated.

28. The method of error correction according to claim 26, further comprising steps of:

providing a mode register for selectively holding inhibit correction-in-part flags in one of an activated state and an inactivated state;

judging whether an error correction is non-deterministic; and reporting the error and aborting a process of said cache memory if the error correction is judged to be non-deterministic when said inhibit correction-in-part flags are activated.

29. The method of error correction according to claim 26, further comprising steps of:

providing a mode register for selectively holding detect inconsistency flags in one of an activated state and an inactivated state;

judging whether an error correction causes inconsistency; and reporting the error and aborting a process of said cache memory if the error correction is judged to cause inconsistency when said detect inconsistency flags are judged to be activated.

* * * * *